US008954545B2

(12) United States Patent
Govil et al.

(10) Patent No.: US 8,954,545 B2
(45) Date of Patent: *Feb. 10, 2015

(54) FAST DETERMINATION OF COMPATIBILITY OF VIRTUAL MACHINES AND HOSTS

(71) Applicant: VMware, Inc., Palo Alto, CA (US)

(72) Inventors: Kinshuk Govil, Palo Alto, CA (US); Kiran Kamath, Mountain View, CA (US); Steven Michael Kusalo, Fremont, CA (US); Mark Russell Johnson, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,463

(22) Filed: Dec. 17, 2012

(65) Prior Publication Data

US 2013/0111475 A1    May 2, 2013

Related U.S. Application Data

(63) Continuation of application No. 12/556,520, filed on Sep. 9, 2009, now Pat. No. 8,359,374.

(51) Int. Cl.
| G06F 15/177 | (2006.01) |
| G06F 15/173 | (2006.01) |
| G06F 15/16 | (2006.01) |
| G06F 9/455 | (2006.01) |
| G06F 9/50 | (2006.01) |

(52) U.S. Cl.
CPC .............. *G06F 9/455* (2013.01); *G06F 9/5044* (2013.01)
USPC ........... 709/220; 709/221; 709/222; 709/223; 709/225; 709/227; 709/228; 709/229; 709/238; 709/239; 709/240; 709/245

(58) Field of Classification Search
USPC ......... 709/221–223, 235, 227–229, 238–240, 709/245
See application file for complete search history.

(56) References Cited

U.S. PATENT DOCUMENTS

| 6,249,820 | B1 * | 6/2001 | Dobbins et al. ............... 709/238 |
| 7,124,188 | B2 * | 10/2006 | Mangipudi et al. ........... 709/226 |
| 7,464,204 | B2 * | 12/2008 | Isobe et al. ...................... 710/74 |
| 8,108,525 | B2 * | 1/2012 | Kumar et al. .................. 709/227 |
| 2002/0198968 | A1 * | 12/2002 | Shirriff ........................ 709/220 |
| 2004/0162901 | A1 * | 8/2004 | Mangipudi et al. ........... 709/225 |
| 2007/0027836 | A1 * | 2/2007 | Isobe et al. ........................ 707/1 |
| 2008/0034057 | A1 * | 2/2008 | Kumar et al. .................. 709/217 |
| 2008/0155087 | A1 * | 6/2008 | Blouin et al. .................. 709/223 |
| 2008/0201455 | A1 * | 8/2008 | Husain .......................... 709/220 |
| 2008/0201479 | A1 * | 8/2008 | Husain et al. .................. 709/227 |
| 2009/0070771 | A1 * | 3/2009 | Yuyitung et al. .............. 718/105 |
| 2009/0077285 | A1 * | 3/2009 | Isobe et al. ...................... 710/74 |

* cited by examiner

*Primary Examiner* — Edward Kim

(57) ABSTRACT

A method of determining compatibility of a virtual machine or virtual machine disk file with a host, including a storage host, is disclosed. A lookup matrix is created to provide a fast compatibility lookup. To create the lookup matrix, computing object properties are retrieved from each of the plurality of computing objects. The computing object properties include resource requirements of each of the plurality of computing objects. Further, host properties are retrieved from each of the plurality of hosts. The method further includes creating host logical groups of a subset of the plurality of hosts having substantially same host properties and creating a plurality of computing object logical groups of a subject of the plurality of computing objects having substantially same computing object properties. The lookup matrix answers whether each member of a selected computing object logical group can be transferred to a selected host logical group.

16 Claims, 5 Drawing Sheets

|  | H1 | H2 | H3 | H4 | H5 |
|---|---|---|---|---|---|
| VM1 | YES | YES | YES | YES | NO |
| VM2 | NO | NO | YES | YES | NO |
| VM3 | YES | YES | YES | NO | YES |
| VM4 | YES | YES | YES | NO | YES |
| VM5 | YES | YES | YES | NO | NO |

Figure 3A

|  | HG1 | HG2 | HG3 | HG4 | HG5 |
|---|---|---|---|---|---|
| VMG1 | YES | YES | YES | YES | NO |
| VMG2 | NO | YES | YES | YES | NO |
| VMG3 | YES | YES | NO | NO | YES |
| VMG4 | YES | YES | YES | NO | YES |
| VMG5 | NO | YES | YES | NO | NO |

Figure 3B

FAST DETERMINATION OF COMPATIBILITY OF VIRTUAL MACHINES AND HOSTS

CROSS REFERENCE TO RELATED APPLICATION

This application is a continuation of the U.S. patent application Ser. No. 12/556,520 filed on Sep. 9, 2009, entitled "Fast Determination or Compatibility of Virtual Machines and Hosts."

BACKGROUND

Virtualization management tools provide improvement in the efficiency of data center computing resources by providing load balancing, high availability and fault tolerance features. For example, when a host (e.g., a hypervisor) fails, shows indications of imminent failure, gets overburdened for any reason or if there is a need for resource scheduling, virtual machines running on the host may be moved to other host or hosts to provided uninterrupted or at least somewhat uninterrupted operations.

Virtualization management tools (e.g., VMware High Availability (HA), VMware Distributed Resource Scheduler (DRS)™, etc.) provide functionality of moving virtual machines from one host to another. Before moving a virtual machine from one host to another, virtualization management tools test a target host to ascertain if the target host includes necessary and sufficient resources to host a moving virtual machine. Movement of a virtual machine during host failures and load balancing operations is a time critical event because any delay would cause interruptions in virtual machine operations and may result in application or session crashes or slow performance.

SUMMARY

In one embodiment, a method of determining compatibility of a virtual machine or virtual machine disk file with a group of hosts, including a storage host, is disclosed. A lookup matrix is created to provide a fast compatibility lookup for a group of computing objects and a group of hosts. To create the lookup matrix, computing object properties are retrieved from each of the plurality of computing objects. The computing object properties include resource requirements of each of the plurality of computing objects. Further, host properties are retrieved from each of the plurality of hosts. The method further includes creating a plurality of host logical groups of a subset of the plurality of hosts having substantially same host properties and creating a plurality of computing object logical groups of a subject of the plurality of computing objects having substantially same computing object properties. The lookup matrix provides answers whether each member of a selected computing object logical group can be transferred to each member of a selected host logical group.

In another embodiment, a system for determining compatibility of a virtual machine in a plurality of virtual machines with a host in a plurality of hosts is disclosed. The system includes a query interface to enable querying a lookup matrix by providing an identity of a virtual machine and an identity of a host to receive an answer as to whether the virtual machine can be moved to the host. The system further includes a data collection interface to enable retrieval of virtual machine properties and host properties. The system also includes a lookup matrix module to retrieve the virtual machine properties and the host properties through the data collection interface and to perform a lookup based on a virtual machine and a host pair and to provide an answer if the virtual machine can run on the host under different data center operations such as power-on, VMotion®, Storage VMotion, etc.

In yet another embodiment, a computer readable media for storing programming instructions for determining compatibility of a computing object in a plurality of computing objects with a host, including storage hosts, in a plurality of hosts is disclosed. The computer readable media includes programming instructions for performing the following method steps: retrieving computing object properties from each of the plurality of computing objects. The computing object properties including resource requirements of each of the plurality of computing objects. Retrieving host properties from each of the plurality of hosts. The host properties including available resources in each of the plurality of hosts. Creating a plurality of host groups of a subset of the plurality of hosts having substantially same host properties and creating a plurality of computing object logical groups of a subject of the plurality of computing objects having substantially same computing object properties. The method further includes creating a lookup matrix including the plurality of computing object logical groups and the plurality of hosts, wherein the lookup matrix provides answers whether each member of a selected computing object group can be transferred to each member of a selected host group. Wherein, the computing object is one of a virtual machine or a virtual machine disk file.

BRIEF DESCRIPTION OF THE DRAWINGS

FIG. 3A illustrates a quick lookup matrix to identify suitable target hosts for virtual machines in a data center in accordance with one or more embodiments of the present invention.

FIG. 3B illustrates a quick lookup matrix to identify suitable group of hosts for a group of virtual machines in a data center in accordance with one or more embodiment of the present invention.

DETAILED DESCRIPTION

Figure 1:
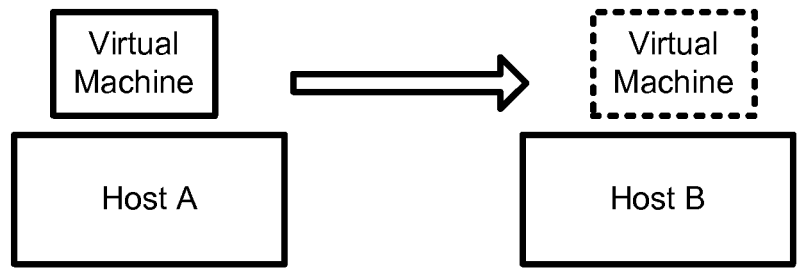
FIG. 1 illustrates moving of a virtual machine from one host to another in accordance with one or more embodiments of the present invention.

FIG. 1 illustrates moving of a virtual machine from Host A to Host B. Virtual machines can be moved on the fly from one host to another if a need arises. Such moving may be necessitated if Host A is undergoing maintenance, showing signs of an imminent failure, lacking resources to run the virtual machine efficiently, a cheaper host available to the virtual machine (in case of a cloud computing environment in which hosts are being rented), etc.

Prior to the virtual machine (of FIG. 1) is moved from Host A to Host B, resource requirements of the virtual machines are identified and compared against the resources provided by Host B. If it is determined that Host B can provide necessary resources to run the virtual machine on Host B, the virtual machine is moved from Host A to Host B. However, in many cases, a movement of a virtual machine from Host A to Host B is a time critical event to prevent or reduce interruptions in virtual machine operations. This testing and comparing of required and available resources may take time and has to be performed every time any virtual machine is moved from one host to another.

Figure 2:
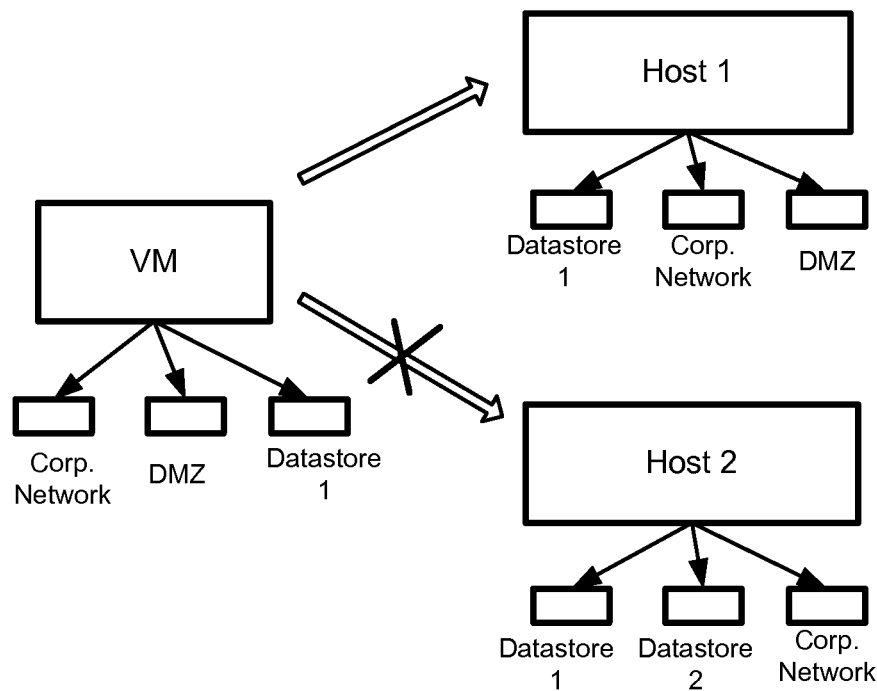
FIG. 2 illustrates a logical diagram of a system to show moving of a virtual machine from one host to another based on resources requirement of the virtual machine in accordance with one or more embodiments of the present invention.

FIG. 2 illustrates an exemplary system to show computing requirement testing and comparison. A virtual machine (VM) is running on some host in a data center. As shown in the example in FIG. 2, VM needs a connection to a corporate network, Demilitarized Zone (DMZ), and an access to Data store 1. Prior to moving VM, a virtualization management system runs tests on a plurality of hosts in the data center to identify a host that can provide a connection to the corporate network, Demilitarized Zone (DMZ), and an access to Data store 1. A target system should also have sufficient spare memory to run the incoming VM. As shown in FIG. 2, Host 1 provides the required resources, hence VM can be moved to Host 1 and not to Host 2 (because DMZ is not available in Host 2).

However, running such compatibility tests on a plurality of hosts, especially when time is short (because a virtual machine needs to be moved without too much undue delay to preserve ongoing transactions and sessions), introduces inefficiency in a data center operations.

FIG. 3A illustrates a decision matrix to quickly provide a lookup for a compatible host without running compatibility tests on a plurality of hosts prior to moving a virtual machine from a host to another. For example, if VM3 can be moved to either one of Host 1, Host 2, Host 3, and Host 5. In one embodiment, a quick test may be performed to measure transient resources (such as memory) on each of these compatible hosts to identify the most suitable host among compatible hosts.

In order to build this matrix, data is collected from virtual machines or hosts either directly or through a virtual infrastructure management tool (such as VMware Virtual Center, etc.). In one embodiment, a resource requirement of a virtual machine can be obtained by reading virtual machine properties. Similarly, resources available in a host can be obtained through device manager interfaces, memory manager interfaces and properties files, etc. In one embodiment, the available resources in a host can also be obtained from a virtual infrastructure management tool, which keeps track of hosts' properties.

After the data is collected, comparisons are made between resource requirements of each virtual machine, or at least a subset of virtual machines in the data center, with the resource availability at each of the hosts, or at least a subset of the hosts in the data center. For example, if a virtual machine needs a DMZ and at least 10GB network connection and host 3 provides a DMZ and 10GB network connection, the virtual machine can run on host 3. This compatibility is stored in a persistent database, in one embodiment. In another embodiment, the compatibility matrix may be stored in memory of a virtual management tool for a speedy lookup.

Resource requirement of a virtual machine and resources provides by a host do not change frequently. Hence, once the compatibility matrix is built, the matrix does not need to be updated frequently. In one embodiment, the compatibility matrix may be updated on a selected interval based on the frequency of updates in virtual machine resource requirements and updates in hosts. In another embodiment, an update of the compatibility matrix is triggered when a resource requirement of a virtual machine is changed or the availability of a particular resource in a host is changed. A virtual infrastructure management tool, which keeps track of virtual machine parameters and hosts' resources may be used to send alerts whenever a relevant data is changed. In one embodiment, only the affected portion of the matrix is updated. For example, if the change occurred in VM3, the row pertaining to VM3 is changed.

FIG. 3B illustrates a decision matrix to quickly provide a lookup for a group of compatible hosts without running compatibility tests on a plurality of hosts prior to moving a virtual machine from a host to another host. In another embodiment, virtual machines having same resource requirements are grouped together in virtual machine groups. Similarly, hosts having same resources are grouped together in virtual groups. Hence, the compatibility matrix only needs to keep track of compatible groups of virtual machines and hosts, and not individual virtual machines and hosts. In a data center having thousands of virtual machines and hosts, such grouping would simplify the compatibility matrix, thereby providing efficient way to calculate the matrix.

Further, when resource requirements of a virtual machine change, the virtual machine is simply moved from one group to another group that includes similar virtual machines. Similarly, if a host configuration is changed, the host is moved from one group to another group of similar hosts. Hence, there is no need to run expensive tests to update the whole matrix when only some of the virtual machines of some of the hosts change. In cases where no virtual machine group is available to accommodated a virtual machine after the resource requirement of the virtual machine is changed, a new group is created. Similarly, if no host group is available to accommodate a host when the computing resources provided by the host are changed, a new host group is created.

In another embodiment, when one or more resource requirements of all virtual machines in a group are changed, the virtual machines are not moved to another group. Instead, the group properties of the existing group of the virtual machines in question are changed to reflect the new resource requirements.

In another embodiment, the compatibility matrix may be requested to be updated on demand at any time by a data center administrator.

In yet another embodiment, other compatible matrices based on resource requirements may be built. For example, a compatibility matrix can be built around the network accessibility requirements. This matrix, for example, will provide a quick lookup of compatible virtual machines and hosts that were matched on requirement and availability of the necessary network accessibility.

In one embodiment, different lookup or decision matrices are built based on various data center operations. For example, a lookup matrix is built for providing a fast lookup when a virtual machine is attempted to be moved from one host to another while the virtual machine is in its running state. A different lookup matrix can be built for providing a fast lookup when a virtual machine is attempted to be moved from one host to another when the virtual machine is in the shutdown state. It may be noted that virtual machines have different host resource requirements when they are moved while in running state and while they are in the shutdown state. For example, a virtual machine in the running state may not be moved from a host with one processor type to a host with another processor type. However, the same virtual machine in the shutdown state may be moved between these host having different types of processor.

Furthermore, in one embodiment, different groups and associated lookup matrices can be built for providing a fast lookup for moving virtual machine disk files. It may be noted that a virtual machines use virtual disk files (for example, a VMware virtual machine uses a virtual machine disk file (VMDK)). These virtual disk files can also be moved from one storage to another while the virtual machines using these virtual disk files are in running or shutdown states. These lookup matrices for VMDK files and compatible datastore provides a fast lookup to determine a group of compatible hosts before moving a VMDK file from one host to another.

Figure 4A:
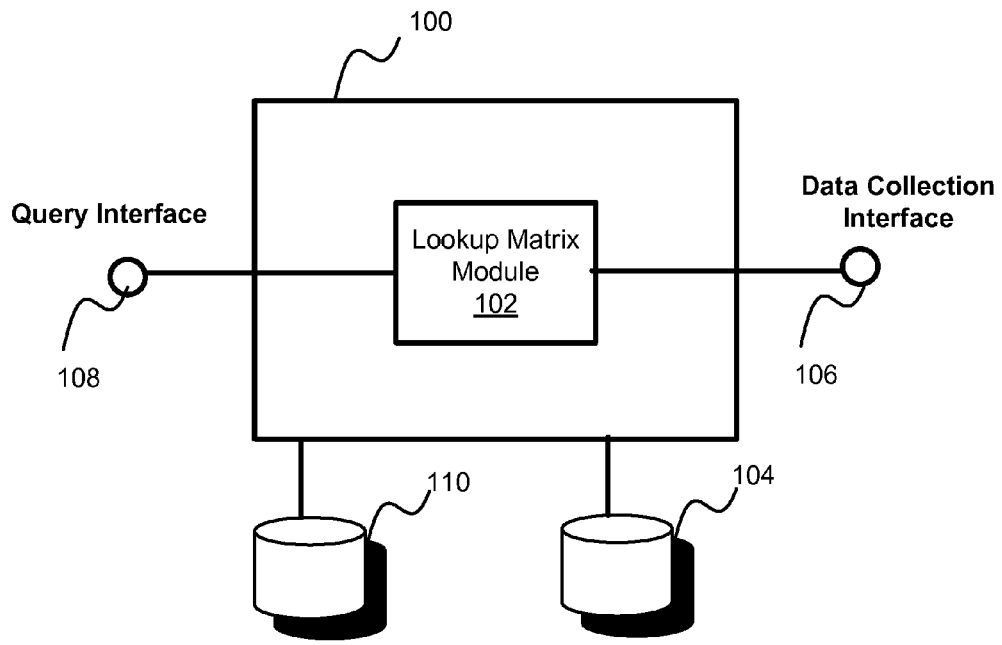
FIG. 4A illustrates a system including a lookup matrix in accordance with one or more embodiments of the present invention.

FIG. 4A illustrates a system 100 having a Lookup Matrix Module 102. Lookup Matrix Module 102 includes a Data Collection Interface 106 to communicate with virtual machines and hosts in a data center. Virtual machine properties and host properties are retrieved through Data Collection Interface 106. After retrieving virtual machine properties and host properties, Lookup Matrix Module 102 creates a lookup matrix by determining which virtual machines can run on which hosts. In one embodiment, this determination is based on specific resource requirements of a virtual machine and availability of these specific resources in a host. The lookup matrix, in one embodiment, is stored in a database table that is stored in a database 104. In other embodiments, the lookup matrix may also be stored in an operating system data file and can be loaded into a memory cache for faster lookup. A Query Interface 108 is includes to provide a caller to make queries to determine if a particular virtual machine can run on a particular host. In one embodiment, a group properties data store 110 is provided to store host and virtual machine group properties.

Figure 4B:
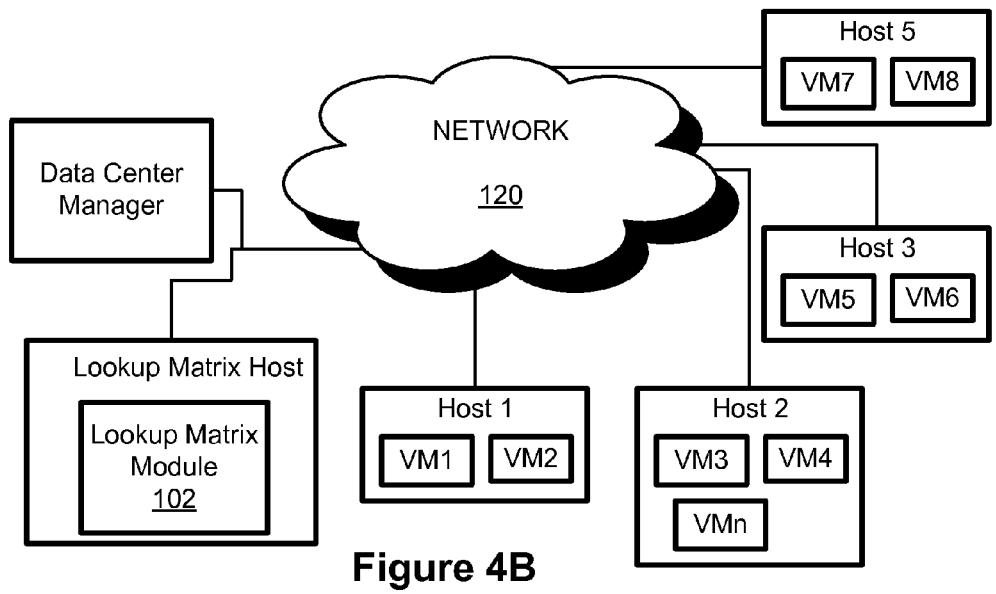
FIG. 4B illustrates a logical diagram of a data center in accordance with one or more embodiments of the present invention.

FIG. 4B illustrates an exemplary data center. The data center includes a plurality of hosts, each host including one or more virtual machines. The data center also includes a central data center manager to configure and manage hosts and virtual machines in the data center. The data center includes a lookup matrix host 100 which includes Lookup Matrix Module 102. Hosts, the data center manager and lookup matrix host 100 are coupled through a network 120. When the data center manager needs to move a computing object such as a virtual machine or a virtual machine disk file a from one host or storage to another, the data center manager queries lookup matrix host 100 to quickly identify the destination host or storage, or to determine if a preselected destination host or storage group is compatible with the computing object being moved from a host or storage to the destination host or storage.

Figure 5:
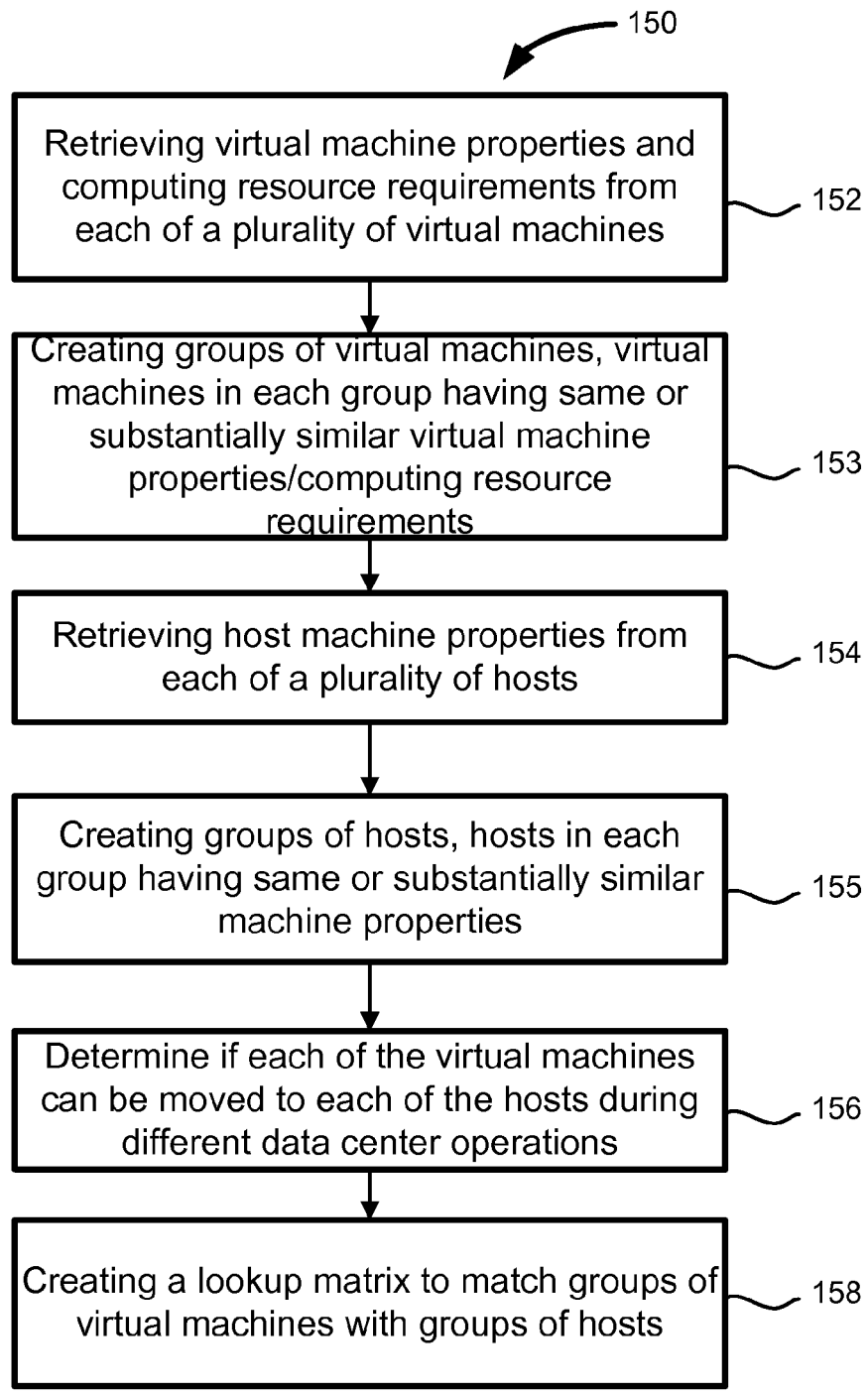
FIG. 5 illustrates a flow diagram of creating a look matrix of virtual machines and hosts, in accordance with one or more embodiments of the present invention.

FIG. 5 illustrates a process 150 of creating a lookup matrix for groups of virtual machines and hosts. At step 152, virtual machine properties are retrieved from each of a plurality of virtual machines. In one or more embodiments, virtual machine properties include specific resource requirements of each of the plurality of virtual machines. For example, a virtual machine may need a connection to a particular corporate network, accessibility of a selected datastore either on an IP network or on storage area network, a minimum amount of free disk space, a minimum amount of physical memory, a minimum amount of network bandwidth, etc. At step 153, logical groups of virtual machines are created. Each group of virtual machines includes virtual machines with same or substantially similar resource requirements. At step 154, host properties are retrieved from each of a plurality of hosts. In one or more embodiments, host properties include specific resources available in each of the plurality of hosts. At step 155, groups of hosts are created. Each group includes hosts having same or similar host properties. At step 156, Lookup Matrix Module determines, based on properties comparisons, if a particular computing object can be transferred on a particular host or if a group of virtual machines is compatible with a particular group of hosts under different data center operations such as VMotion, power-on, Storage VMotion, etc. At step 158, the results of these determinations are recorded in a persistent form and stored in a data structure suitable for providing a fast lookup.

Figure 6:
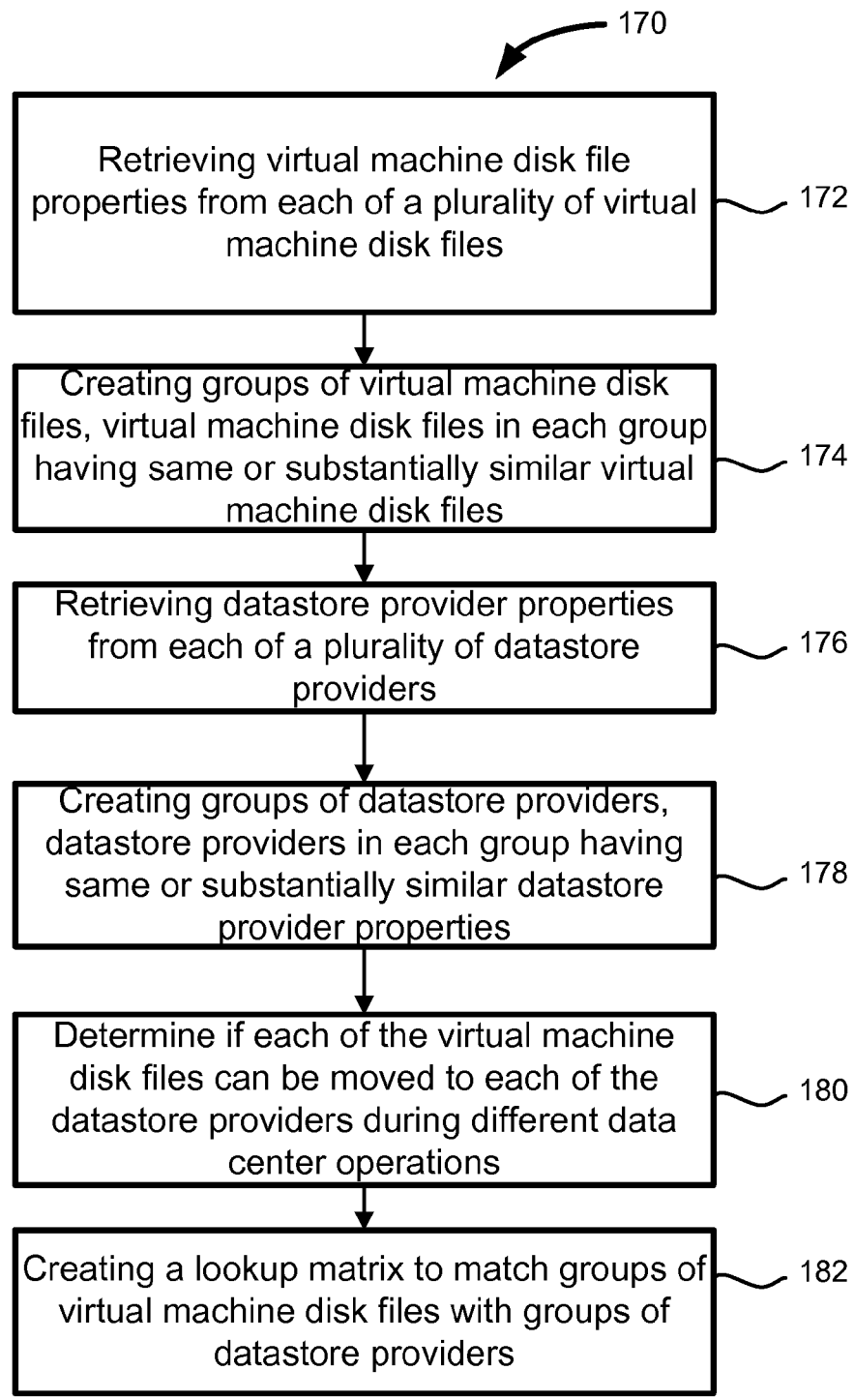
FIG. 6 illustrates a flow diagram of creating a look matrix of virtual machine disk files and datastorage providers in accordance with one or more embodiments of the present invention.

FIG. 6 illustrates a process 170 of creating a lookup matrix for groups of virtual machine disk files and datastore providers. At step 172, virtual machine disk file properties are retrieved from each of a plurality of virtual machine disk files. In one or more embodiments, virtual machine disk file properties include specific datastore resource requirements of each of the plurality of virtual machine disk files. For example, a virtual machine disk file may need a datastore with a specific storage capacity and data access speed, storage network speed, etc. At step 174, logical groups of virtual machine disk files are created. Each group of virtual machine disk files includes virtual machine disk files with same or substantially similar resource requirements. At step 176, datastore provider properties are retrieved from each of a plurality of datastore providers. In one or more embodiments, datastore providers are storage area network (SAN) hosts or other types of network storage systems. In one or more embodiments, datastore provider properties include specific storage resources available in each of the plurality of datastore providers. At step 178, groups of datastore providers are created. Each group includes datastore providers having same or similar datastore provider properties. At step 180, Lookup Matrix Module determines, based on properties comparisons, if a particular virtual machine disk file can be transferred on a particular datastore provider or if a group of virtual machine disk files is compatible with a particular group of datastore provider during different data center operations such as VMotion, power-on, Storage VMotion, etc. At step 158, the results of these determinations are recorded in a persistent form and stored in a data structure suitable for providing a fast lookup.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A computer-implemented method of determining compatibility of a virtual machine in a plurality of virtual machines with a host in a plurality of hosts, the method comprising:
    retrieving virtual machine properties from each of the plurality of virtual machines, the virtual machine properties including computing resource requirements of each of the plurality of virtual machine;
    retrieving host properties from each of the plurality of hosts, the host properties including available resources in each of the plurality of hosts;
    creating a plurality of host logical groups of a subset of the plurality of hosts having substantially same host properties;
    creating a plurality of virtual machine logical groups of a subset of the plurality of virtual machines having substantially same virtual machine properties;
    creating a lookup matrix including the plurality of virtual machine logical groups and the plurality of host logical groups, wherein the lookup matrix provides answers whether each member of a particular virtual machine logical group can be transferred to each member of a particular host logical group; and
    updating the lookup matrix if the host properties of a host change, wherein the updating includes moving the host to another host logical group that contains hosts having substantially same host properties as the host, wherein if the host properties of all hosts in a host logical group change then properties of the host logical group are changed and hosts are not transferred to another host logical group, and wherein the host properties of each host logical group are collectively distinguishable from the host properties of any other host group.

2. The method as recited in claim 1, wherein the lookup matrix provides a Boolean answer to a query if a selected virtual machine in the plurality of virtual machines can be transferred to a selected host in the plurality of hosts.

3. The method as recited in claim 2, wherein the query is initiated from a virtual infrastructure management tool prior to moving the selected virtual machine to the selected host in the plurality of hosts.

4. The method as recited in claim 3, wherein if the Boolean answer is affirmative, the virtual infrastructure management tool effectuating moving of the selected virtual machine to the selected host.

5. The method as recited in claim 3, wherein if the Boolean answer is negative, the virtual infrastructure management tool initiating another query to be processed through the lookup matrix by replacing the selected host by a another selected host in the plurality of hosts.

6. A computer-implemented method of determining compatibility of a virtual machine disk file in a plurality of virtual machine disk files with a datastore provider in a plurality of datastore providers, the method comprising:
    retrieving virtual machine disk file properties from each of the plurality of virtual machine disk files, the virtual machine disk file properties including storage resource requirements of each of the plurality of virtual machine disk files;
    retrieving datastorage provider properties from each of the plurality of datastore providers, the datastore provider properties including available storage resources in each of the plurality of datastore providers;
    creating a plurality of datastore provider logical groups of a subset of the plurality of datastore providers having substantially same storage provider properties;
    creating a plurality of virtual machine disk file logical groups of a subset of the plurality of virtual machine disk files having substantially same virtual machine disk file properties;
    creating a lookup matrix including the plurality of virtual machine disk file logical groups and the plurality of datastore provider logical groups, wherein the lookup matrix provides answers whether each member of a selected virtual machine disk file logical group can be moved to each member of a selected datastore provider logical group; and
    updating the lookup matrix if the virtual machine disk file properties of a virtual machine disk file change, wherein the updating includes moving the virtual machine disk file to another virtual machine disk file logical group that contains virtual machine disk files having substantially same virtual machine disk file properties as the virtual machine disk file, wherein if the virtual machine disk file properties of all virtual machine disk files in a virtual machine disk file logical group change then properties of the virtual machine disk file logical group are changed and virtual machine disk files are not moved to another virtual machine disk file logical group.

7. The method as recited in claim 6, further comprising:
    updating the lookup matrix if the datastore provider properties of a datastore provider change, wherein the updating includes moving the datastore provider to another datastore provider logical group that contains datastore providers having substantially same datastore provider properties as the datastore provider, wherein if the datastore provider properties of all datastore providers in a datastore provider logical group change then properties of the datastore provider logical group are changed and datastore providers are not moved to another datastore provider logical group.

8. The method as recited in claim 6, wherein the lookup matrix provides a Boolean answer to a query if a selected virtual machine disk file in the plurality of virtual machine disk files can be transferred to a selected datastore provider in the plurality of datastore providers.

9. The method as recited in claim 8, wherein the query is initiated from a virtual infrastructure management tool prior to moving the selected virtual machine disk file to the selected datastore provider in the plurality of datastore providers.

10. The method as recited in claim 9, wherein if the Boolean answer is affirmative, the virtual infrastructure management tool effectuating moving of the selected virtual machine disk file to the selected datastore provider.

11. The method as recited in claim 10, wherein if the Boolean answer is negative, the virtual infrastructure management tool initiating another query to be processed through the lookup matrix by replacing the selected datastore provider by a another selected datastore provider in the plurality of datastore providers.

12. A non-transitory computer-readable storage medium having instructions embodied therein when executed cause a computer system to perform a method of determining compatibility of a virtual computing object with a host, said method comprising:
   accessing resource requirements for each of a plurality of virtual computing objects in a virtualization infrastructure;
   accessing available resources for each of a plurality of hosts in said virtualization infrastructure;
   generating groupings of said plurality of virtual computing objects based on similarities of said resource requirements;
   generating groupings of said plurality of hosts based on similarity of said available resources;
   generating a lookup matrix comprising said groupings of plurality of virtual computing objects and said groupings of said plurality of hosts, wherein said lookup matrix is configured to facilitate in determining whether a host in one of said groupings of said plurality of hosts comprises available resources for a virtual computing object in one of said groupings of said plurality of virtual computing objects; and
   updating the lookup matrix if the available resources of a host change, wherein the updating includes moving the host to another of said plurality of virtual computing objects that contains hosts having substantially same available resources as the host, wherein if the available resources of all hosts in said plurality of virtual computing objects change then resources of said plurality of virtual computing objects are changed and hosts are not transferred to another grouping of virtual computing objects, and wherein the available resources of each virtual computing objects are collectively distinguishable from the available resources of any other host group.

13. The non-transitory computer-readable storage medium of claim 12, wherein said virtual computing objects comprises virtual machines.

14. The non-transitory computer-readable storage medium of claim 12, wherein said virtual computing objects comprises virtual machine disk files.

15. The non-transitory computer-readable storage medium of claim 12, further comprising:
   updating only a portion of said lookup matrix.

16. The non-transitory computer-readable storage medium of claim 12, further comprising:
   transferring said virtual computing object to a host having said available resources while said virtual computing object is running.

* * * * *